(12) United States Patent
Kowalchuk

(10) Patent No.: US 8,448,587 B2
(45) Date of Patent: May 28, 2013

(54) ROW UNIT BOUNCE MONITORING SYSTEM

(75) Inventor: Trevor Kowalchuk, Saskatoon (CA)

(73) Assignee: CNH Canada, Ltd. (CA)

( * ) Notice: Subject to any disclaimer, the term of this patent is extended or adjusted under 35 U.S.C. 154(b) by 603 days.

(21) Appl. No.: 12/693,671

(22) Filed: Jan. 26, 2010

(65) Prior Publication Data

US 2011/0184551 A1 Jul. 28, 2011

(51) Int. Cl.
*A01C 15/00* (2006.01)

(52) U.S. Cl.
USPC .......................................... 111/903; 111/200

(58) Field of Classification Search
USPC .................... 111/200, 903, 900; 701/1, 50
See application file for complete search history.

(56) References Cited

U.S. PATENT DOCUMENTS

| | | | |
|---|---|---|---|
| 5,075,855 A | 12/1991 | Sugasawa et al. | |
| 5,143,159 A * | 9/1992 | Young et al. | 172/8 |
| 5,199,000 A * | 3/1993 | Takahashi | 365/189.09 |
| 5,243,512 A | 9/1993 | Putman et al. | |
| 5,383,133 A | 1/1995 | Staple | |
| 5,430,432 A | 7/1995 | Camhi et al. | |
| 5,487,006 A | 1/1996 | Kakizaki et al. | |
| 5,893,892 A | 4/1999 | Loeffler | |
| 5,955,942 A | 9/1999 | Slifkin et al. | |
| 5,956,255 A * | 9/1999 | Flamme | 700/244 |
| 6,196,327 B1 * | 3/2001 | Patel et al. | 172/7 |
| 6,199,000 B1 | 3/2001 | Keller et al. | |
| 6,386,128 B1 * | 5/2002 | Svoboda et al. | 111/200 |
| 6,778,894 B2 | 8/2004 | Beck et al. | |
| 6,885,968 B2 | 4/2005 | Breed et al. | |
| 6,898,501 B2 | 5/2005 | Schubert | |
| 6,941,225 B2 | 9/2005 | Upadhyaya et al. | |
| 7,013,832 B2 | 3/2006 | Sexton et al. | |
| 7,027,953 B2 | 4/2006 | Klein | |
| 7,168,324 B2 | 1/2007 | Boda et al. | |
| 7,467,034 B2 | 12/2008 | Breed et al. | |
| 7,552,577 B2 * | 6/2009 | Strosser | 56/10.2 R |
| 8,078,367 B2 * | 12/2011 | Sauder et al. | 701/50 |
| 2004/0122580 A1 | 6/2004 | Sorrells | |
| 2004/0243351 A1 | 12/2004 | Calkins et al. | |
| 2008/0306706 A1 | 12/2008 | Markovic | |
| 2009/0164060 A1 | 6/2009 | Fortson et al. | |

* cited by examiner

*Primary Examiner* — Alicia Torres
(74) *Attorney, Agent, or Firm* — Rebecca Henkel

(57) ABSTRACT

An agricultural implement system is provided that includes a row unit configured to deposit seeds within soil. The agricultural implement system also includes a bounce sensor rigidly coupled to the row unit and configured to output a signal indicative of a bounce magnitude, a bounce direction, or a combination thereof, of the row unit.

20 Claims, 6 Drawing Sheets

ROW UNIT BOUNCE MONITORING SYSTEM

BACKGROUND

The invention relates generally to ground working equipment, such as agricultural equipment, and more specifically, to an implement incorporating a bounce monitoring system configured to measure movement of row units.

Generally, seeding implements are towed behind a tractor or other work vehicle via a mounting bracket secured to a rigid frame of a planter or seeder. These seeding implements typically include a ground engaging tool or opener that forms a seeding path for seed deposition into the soil. The opener is used to break the soil to enable seed deposition. After the seed is deposited, the opener is followed by a packer wheel that packs the soil on top of the deposited seed.

Certain seeding implements include a metering system configured to provide a flow of seeds to a seed tube which deposits the seeds into the soil. By operating the metering system at a particular speed, a desired seed spacing may be established as the implement traverses a field. Unfortunately, lateral and/or vertical movement (e.g., bounce, vibration, acceleration, etc.) of the seeding implements may cause the metering systems to vary the rate at which seeds are deposited into the soil. For example, if a seeding implement encounters rough or uneven terrain, the seeding implement may experience undesirable movement which induces the metering system to deposit too many or too few seeds in a particular location, thereby resulting in uneven distribution of seeds within a field. As will be appreciated, the magnitude of the bounce may be dependent on the speed at which the implement is traveling. Consequently, an operator may limit the speed of the work vehicle to provide an even distribution of seeds within the field. Unfortunately, limiting work vehicle speed increases the duration of the planting or seeding process, thereby reducing efficiency of farming operations.

BRIEF DESCRIPTION

The present invention provides an implement including a bounce sensor configured to monitor movement of at least one row unit such that an operator may adjust the implement speed and/or row unit down force based on the magnitude of the bounce to maintain a substantially even flow of seeds from the row unit. In an exemplary embodiment, the agricultural implement system includes a row unit configured to deposit seeds within soil. The agricultural implement system also includes a bounce sensor rigidly coupled to the row unit and configured to output a signal indicative of a bounce magnitude, a bounce direction, or a combination thereof, of the row unit. In certain configurations, the bounce information is relayed to an operator within a tow vehicle such that the operator may adjust the implement speed and/or row unit down force to limit row unit bounce and provide a substantially even flow of seeds from the row unit. Certain row units also include a seed sensor configured to measure a rate of seed flow from the row unit. Such seed sensors may be configured to relay information to the operator via a networked sensor interface. In certain configurations, the bounce sensor shares the interface with the seed sensor, thereby reducing implementation costs associated with monitoring row unit bounce.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
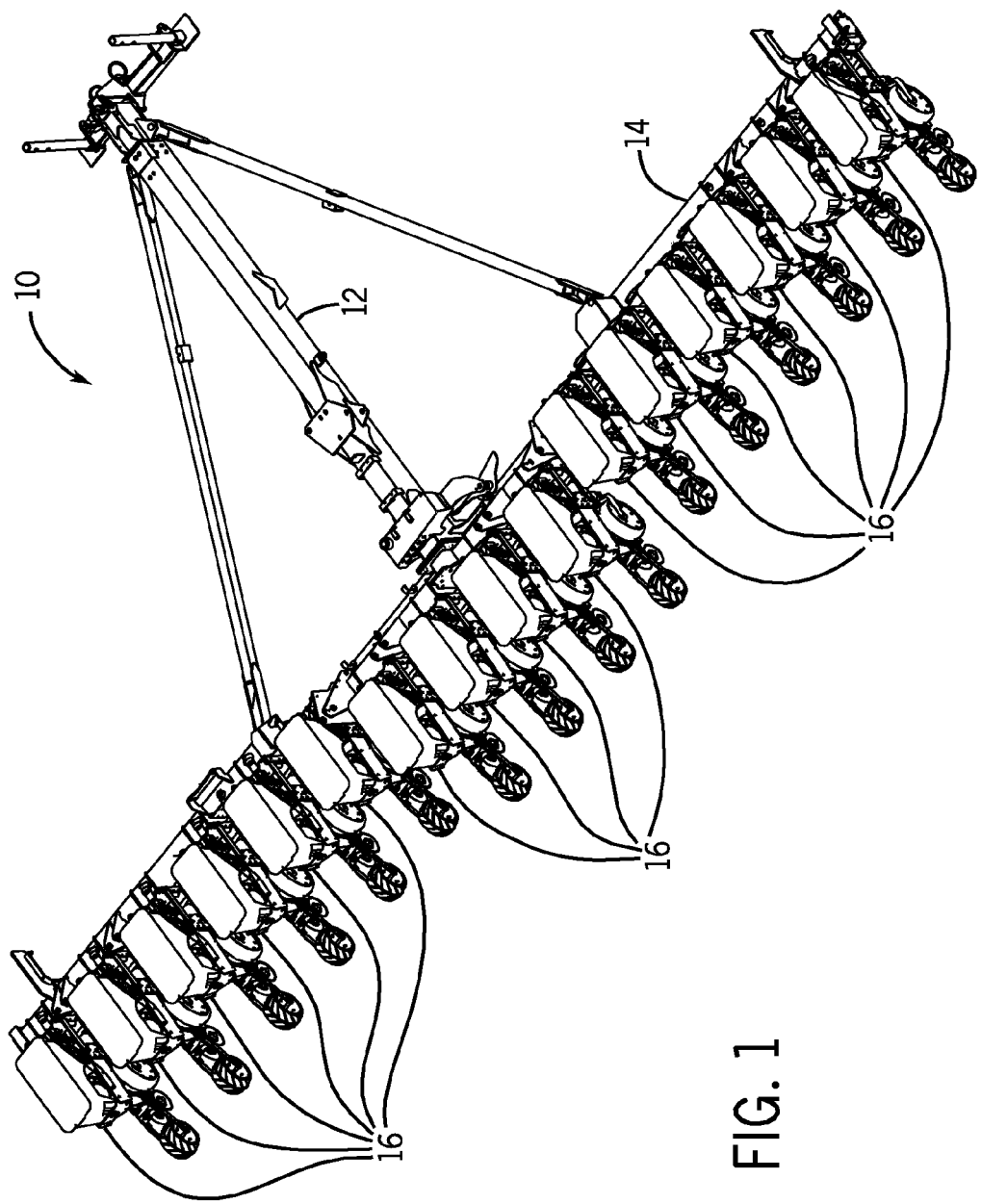
FIG. 1 is a perspective view of an exemplary agricultural implement including at least one row unit having a bounce sensor configured to detect movement of the row unit.

Turning now to the drawings, FIG. 1 is a perspective view of an agricultural implement 10 designed to be towed behind a work vehicle such as a tractor. The implement 10 includes a tow bar assembly 12 which is shown in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple seeding implements or row units 16. As discussed in detail below, one or more row units 16 may include a bounce sensor configured to detect a magnitude and/or a direction of row unit bounce. The bounce information may be transmitted to a user interface of the work vehicle such that an operator may monitor movement of the implement 10. Based on the bounce information, the operator may adjust the speed of the work vehicle and/or row unit down force such that the bounce remains below a desired limit for proper seed distribution. In certain embodiments, the bounce sensor may utilize a networked sensor interface configured to transmit seed flow rate data from an optical seed sensor to an electronic control unit (ECU) of the implement 10. Such embodiments may significantly decrease the cost associated with implementing a bounce monitoring system because no additional bus or electrical supply system need be employed to operate the bounce sensors.

Figure 2:
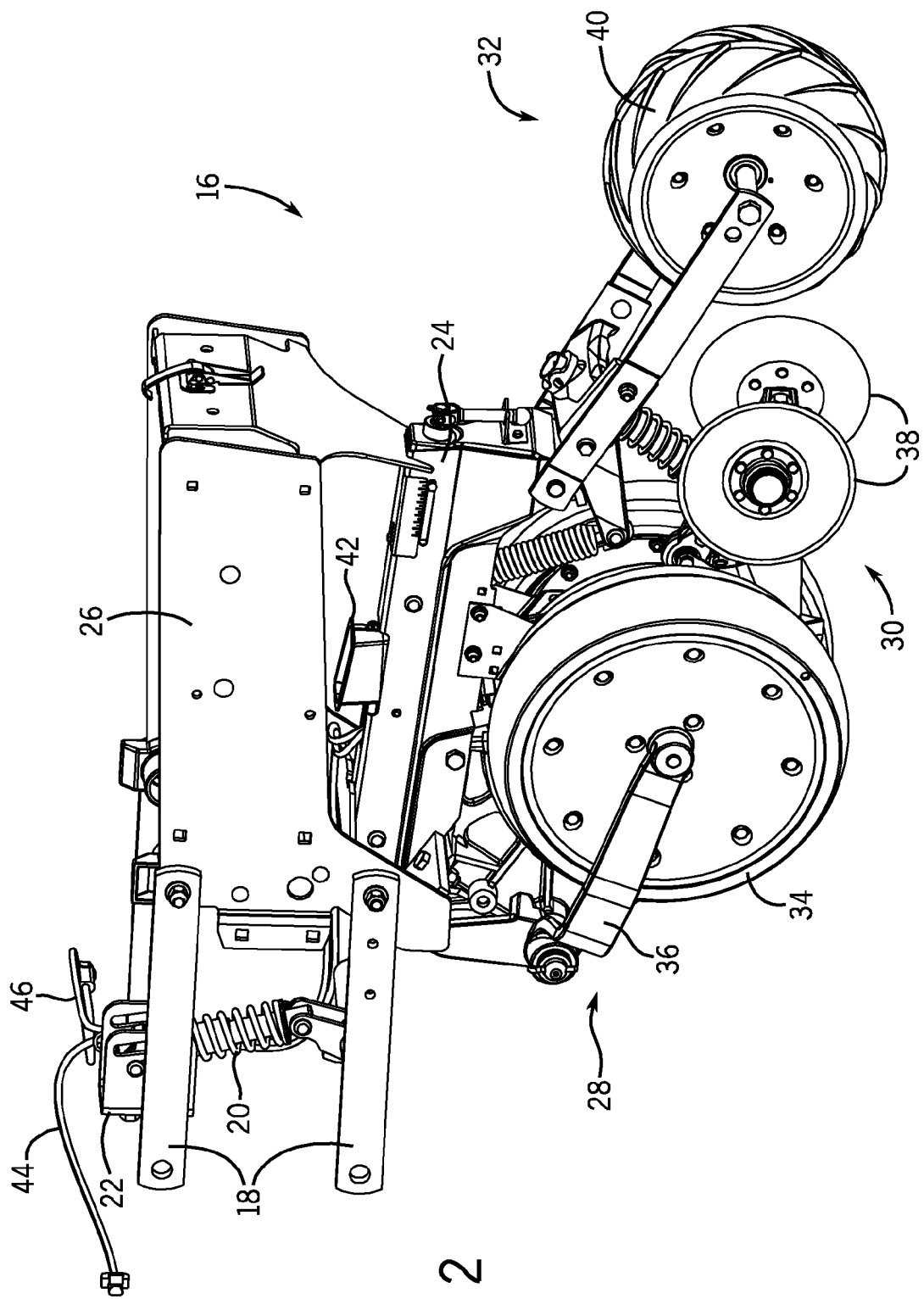
FIG. 2 is a perspective view of an exemplary row unit that may be employed within the agricultural implement shown in FIG. 1.

FIG. 2 is a perspective view of an exemplary row unit 16 that may be employed within the agricultural implement 10 shown in FIG. 1. As illustrated, the row unit 16 includes elements 18 of a parallel linkage assembly, also known as a four bar linkage, configured to couple the row unit 16 to the tool bar 14, while enabling vertical movement of the row unit 16. Other arrangements may also be used that accommodate the bounce detection and processing described below. In addition, a biasing member 20 extends between a mounting bracket 22 and a lower portion of the parallel linkage to establish a contact force between the row unit 16 and the soil. In certain configurations, the biasing member 20 is adjustable to vary the contact force based on field conditions. For example, the biasing member 20 may be adjusted to compensate for excessive bounce as detected by the bounce sensors. The parallel linkage elements 18 are pivotally coupled to a chassis 24 and a frame 26. The frame 26 may be configured to support various elements of the row unit 16 such as a metering system, for example.

As illustrated, the chassis 24 supports a coulter assembly 28, a soil closing assembly 30, and a packer assembly 32. In the present configuration, the coulter assembly 28 includes a gauge wheel 34 coupled to the chassis 24 by a rotatable arm 36. As discussed in detail below, the gauge wheel 34 may be positioned a vertical distance above a coulter disk to establish a desired trench depth for seed deposition into the soil. As the row unit 16 travels across a field, the coulter disk excavates a trench into the soil, and seeds are deposited into the trench. Next, closing disks 38 of the closing assembly 30 push the excavated soil into the trench, and a packer wheel 40 of the packer assembly 30 packs the soil on top of the deposited seeds. This process establishes a row of planted seeds within a field. By employing multiple row units 16 distributed along the tool bar 14, as shown in FIG. 1, multiple rows of seeds may be planted within the field.

As discussed in detail below, the chassis 24 also supports a seed tube 42 configured to provide seeds from a metering system to the soil. The exit to the seed tube 42 is positioned aft of the coulter disk and forward of the closing disks 38 such that the seeds are deposited into the trench before the trench is closed. In certain configurations, the seed tube 42 includes an optical seed sensor configured to measure a flow of seeds through the tube 42. The row unit 16 may also include a networked sensor interface configured to send signals from the seed sensor to an electronic control unit (ECU) of the implement 10 via a bus. As illustrated, a pair of wires 44 and 46 serve to communicatively couple the optical seed sensor to the ECU. In certain configurations, the first wire 44 of one row unit 16 may be coupled to the second wire 46 on another row unit to establish the bus linking the row units 16 to the ECU. Consequently, a signal transmitted by the networked sensor interface of each row unit 16 will be transmitted along the bus to the ECU.

In certain embodiments, a bounce sensor may be coupled to the seed tube 42 and share the networked sensor interface and bus with the optical seed sensor. The bounce sensor may measure the bounce magnitude and/or direction of the row unit 16 and send a signal to the ECU indicative of the bounce. The ECU may then convey the bounce information to a user interface within the tow vehicle such that the operator is provided with an indication of the level of bounce. For example, in certain embodiments, the operator may be provided with an average and/or maximum degree of bounce across all of the row units 16 within the implement 10. The operator may then adjust the speed of the tow vehicle and/or row unit down force based on the level of bounce. By limiting the speed of the vehicle and/or row unit down force, row unit bounce may be reduced, thereby enabling the metering systems to provide a substantially continuous flow of seeds into the soil. Because the bounce sensors utilize the same bus as the optical seed sensors, the present embodiment may be more cost effective to implement compared to embodiments which utilize a separate bus to convey bounce data to an operator.

Figure 3:
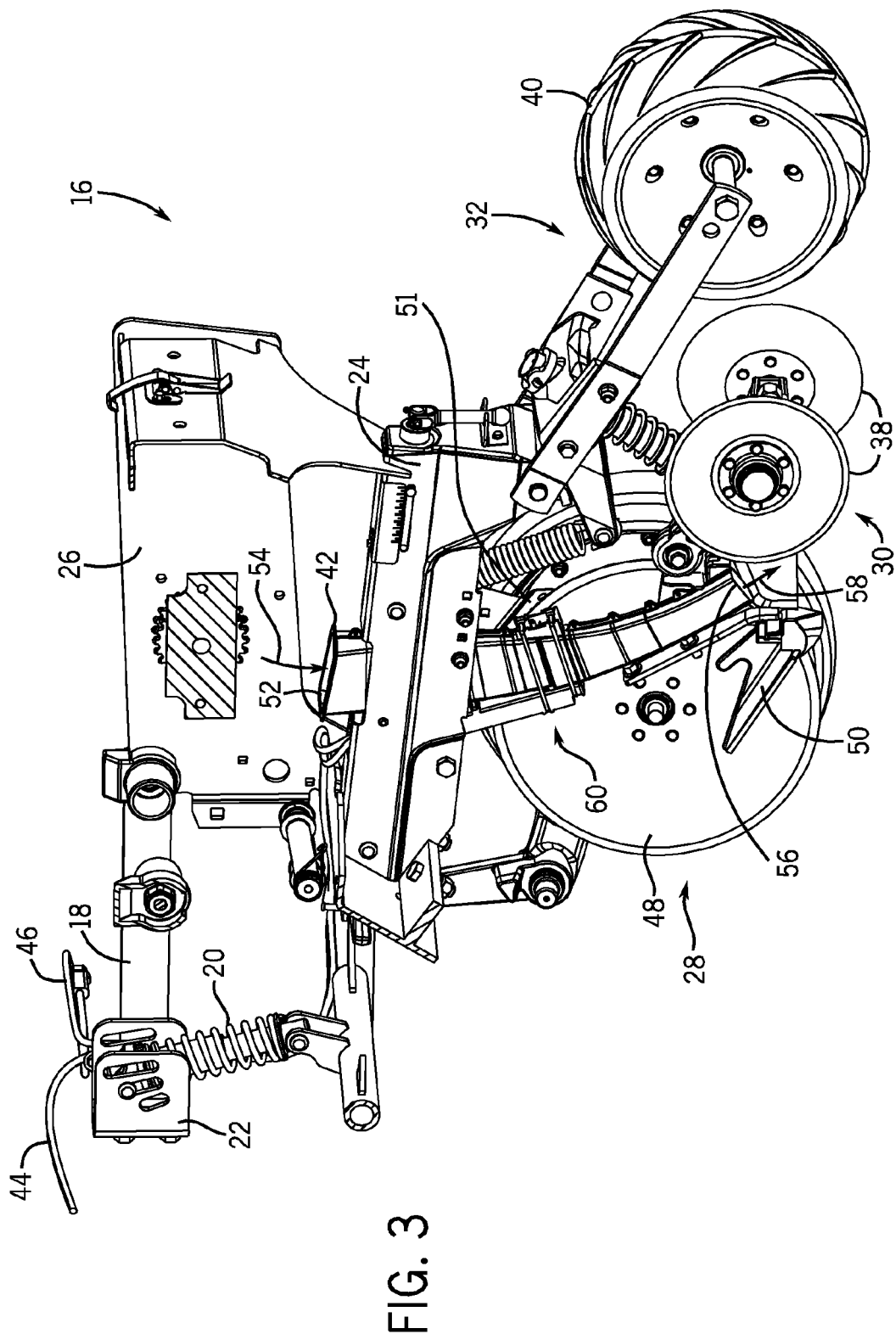
FIG. 3 is a perspective view of the row unit, as shown in FIG. 2, with certain structural elements removed to expose a seed tube having an optical seed sensor and a bounce sensor.

FIG. 3 is a perspective view of the row unit 16, as shown in FIG. 2, with certain structural elements removed to expose the seed tube 42. As illustrated, the coulter assembly 28 includes a coulter disk 48, a firming point 50 and a scraper 51, in addition to the gauge wheel 34 and rotatable arm 36 shown in FIG. 2. As previously discussed, the coulter disk 48 is configured to excavate a trench into the soil such that seeds may be deposited within the trench. The firming point 50 firms the loose soil in the bottom of the trench made by the coulters 48 to provide a consistent v-shape for the seed to sit. The scraper 51 is disposed against the disk 48 and configured to remove accumulated soil from the disk 48 as the disk rotates. The seed tube 42 is positioned aft of the coulter disk 48 and configured to transfer seeds from the metering system to the soil. Specifically, the seed tube 42 includes an inlet 52 configured to receive a flow of seeds from the metering system along a direction 54. The seeds then flow through the tube 42 and exit an outlet 56 of the tube in a direction 58. The outlet 56 is positioned such that the seeds are deposited within the freshly excavated trench. The closing disks 38, positioned aft of the seed tube 42, are configured to close the trench, and the packing wheel 40 is configured to pack the soil over the deposited seeds.

As illustrated, the seed tube 42 includes an optical seed sensor 60 configured to detect seeds passing through the tube 42. In certain configurations, such as when planting corn, sorghum, soybean, and other crops, seeds are fed individually from the metering system to the soil via the seed tube 42. In such configurations, the optical seed sensor 60 may detect the presence of each seed as it passes the sensor and relay the seed detection information to the ECU within the implement 10. As discussed in detail below, the optical seed sensor 60 may include a transmitter and a receiver positioned on opposite sides of the seed tube 42. The transmitter is configured to emit a light beam (e.g., visible, infrared, ultraviolet, etc.) toward the receiver. As a seed passes through the seed tube 42, the seed will interrupt the beam, thereby activating the optical seed sensor 60. In certain configurations, the ECU will relay the seed detection information to a controller within the tow vehicle. The controller may be configured to monitor the rate at which seeds are passing through the seed tube 42 of each row unit 16. If the rate is greater or less than a desired level, the controller may alert the operator of the condition.

In certain embodiments, a bounce sensor is mounted to the seed tube 42 within the same housing as the optical seed sensor 60. In alternative embodiments, the bounce sensor may be mounted within the seed tube 42, or within other areas of the row unit 16, such as the chassis 24 or the frame 26, for example. The bounce sensor is configured to detect a magnitude and/or a direction of row unit bounce, and relay the bounce data to the ECU. As discussed in detail below, the bounce sensor and the optical seed sensor 60 may utilize a common networked sensor interface on the row unit 16 to communicate with the ECU via a bus. The bounce data may then be transmitted from the ECU to the controller within the work vehicle. The controller, in turn, may convey the bounce data to the operator. For example, a user interface within the tow vehicle may indicate an average bounce magnitude and/or direction for each row unit 16. Alternatively, the user interface may provide the operator with an indication of the average bounce magnitude and/or direction for all of the row units 16. In practice, the indication may be as simple as a light or other visual or auditory alarm that informs the operator that an unwanted degree of bounce has been reached. Such bounce may be caused by machine conditions, ground conditions, speed over the ground, or a combination of factors. The operator may then address the problem by slowing the vehicle speed, adjusting the biasing member 20, inspecting the implement, or by any other suitable response.

The operator may monitor both the seed flow rate data and the bounce data to determine a proper speed to operate the work vehicle and/or a proper row unit down force. As will be appreciated, row unit bounce is at least partially dependent on the evenness of the terrain, the row unit down force and the speed at which the implement 10 is traveling over the terrain. As will be further appreciated, row unit bounce may cause an uneven flow of seeds from the metering system to the seed tube 42. For example, if the implement 10 encounters rough or uneven terrain, the implement may experience undesirable movement which induces the metering system to flow too many or too few seeds, thereby resulting in uneven distribution of seeds within a field. Consequently, the operator may monitor the seed flow rate, as measured by the optical seed sensors 60, to determine whether the seeds are being evenly distributed within the soil. If the seed flow rate is not even, the operator may reduce the speed of the work vehicle and/or adjust the biasing member 20 to reduce row unit bounce, thereby maintaining a substantially consistent seed flow rate. However, uneven seed distribution may be caused by other factors unrelated to row unit bounce, such as worn components within the metering system. In such situations, reducing vehicle speed and/or decreasing row unit down force may have only a negligible impact on seed flow rate consistency.

Consequently, the present embodiment employs the bounce sensor to enable the operator to correlate the uneven seed flow rate with excessive bounce. For example, if the operator determines that the flow of seeds is uneven, but the level of bounce is within an acceptable threshold, the operator may maintain vehicle speed because reducing speed may have no significant effect on the seed flow rate. However, after seeding or planting is complete, the operator may perform maintenance on the metering system to correct the seed flow inconsistencies. Conversely, if the operator determines that the flow of seeds is uneven and the level of bounce is outside of the acceptable threshold, the operator may reduce vehicle speed and/or decrease row unit down force to reduce row unit bounce, thereby restoring the even flow of seeds from the metering system. Because the present bounce sensor facilitates increased operator awareness as to the cause of uneven seed distribution, the present embodiment may increase the efficiency of seeding and planting operations.

As previously discussed, row unit bounce may be caused by the row unit 16 contacting a trench, uneven terrain, plant residue, rocks, or other obstructions, thereby inducing the metering systems to vary the rate at which seeds are deposited into the soil. As will be appreciated, bounce may be defined as linear movement, angular movement, linear velocity, angular velocity, linear acceleration, angular acceleration, and/or higher order derivatives of translation and/or rotation of the row unit 16. Consequently, the bounce sensor may be any suitable device configured to measure linear velocity, angular velocity, linear acceleration, angular acceleration, force, moment, or other parameters indicative of row unit bounce.

For example, the bounce sensor may be an accelerometer configured to measure acceleration of the row unit 16. Suitable accelerometers may include, but are not limited to, piezoelectric sensors, shear mode accelerometers, surface micromachined capacitive sensors, capacitive spring mass base accelerometers, magnetic induction accelerometers, or surface acoustic wave accelerometers, among others. Alternatively, the bounce sensor may be a device configured to measure the position of the row unit 16 relative to the tool bar 14. For example, a linear potentiometer, an optical transducer or an electromagnetic pickup may be utilized to measure the rate of movement of the row unit 16. In further embodiments, a stain gauge may be coupled to a structural element (e.g., chassis 24, frame 26, etc.) to measure deformation of the element. As will be appreciated, the degree of deformation of the element is at least partially dependent on the force and/or moment experienced by the element. Consequently, the strain gauge may effectively measure the bounce of the row unit 16. In yet further embodiments, a gyroscope (e.g., mechanical, fiber optic, laser ring, vibrating structure, etc.) may be employed to detect rotation and/or rotation rates associated with row unit bounce.

Figure 4:
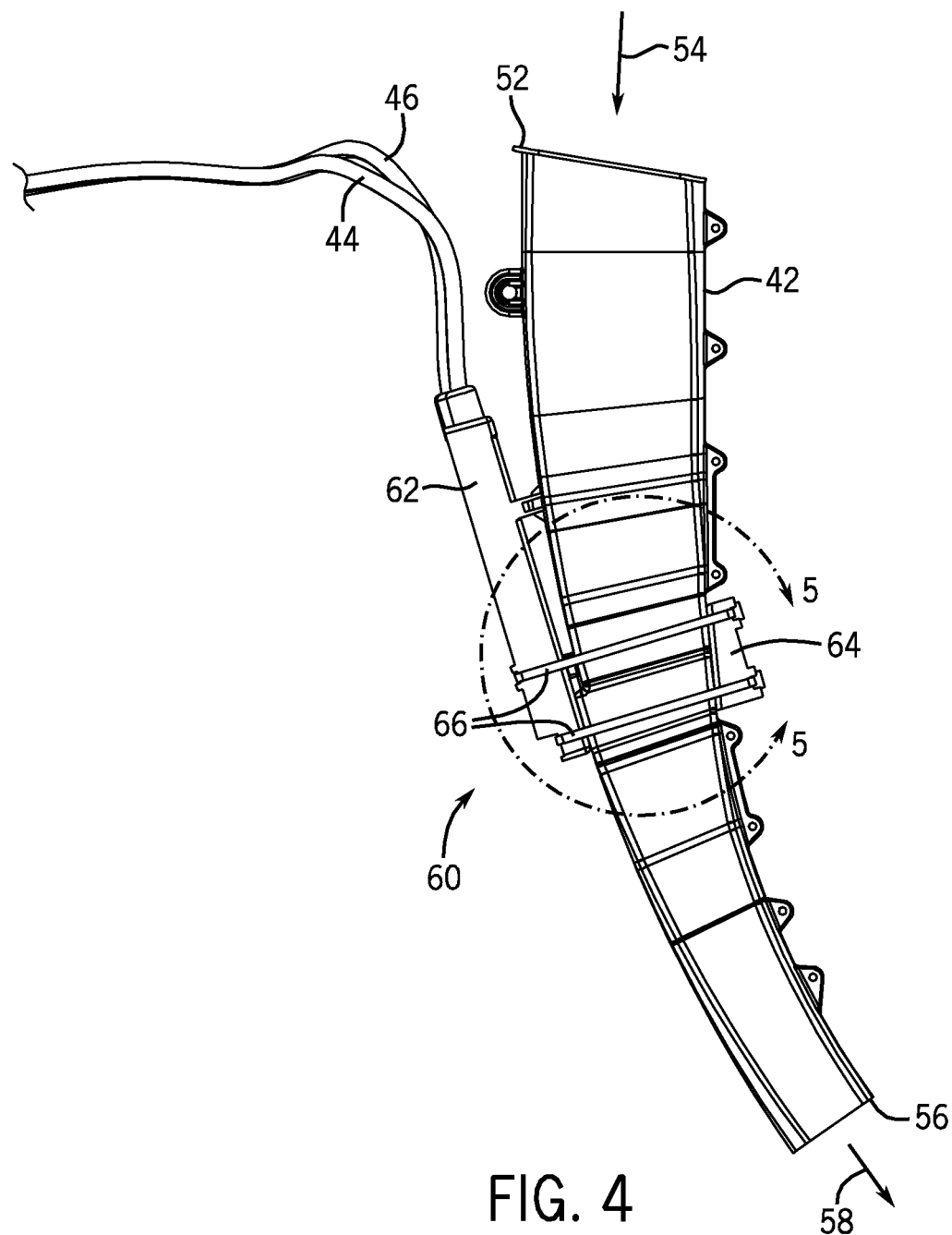
FIG. 4 is a side view of the seed tube shown in FIG. 3, illustrating a sensor housing which may contain the optical seed sensor, the bounce sensor and associated circuitry.

FIG. 4 is a side view of the seed tube 42 shown in FIG. 3, illustrating a sensor housing which may contain the optical seed sensor 60, the bounce sensor and associated circuitry. As illustrated, a first housing 62 is coupled to one side of the seed tube 42, and a second housing 64 is coupled to an opposite side of the seed tube 42. In the present embodiment, a pair of straps 66 serve to secure the first and second housings 62 and 64 to the seed tube 42. However, in alternative embodiments, various other coupling systems (e.g., adhesive, fasteners, etc.) may be employed, either individually or in combination, to mount the housings 62 and 64 to the tube 42. As previously discussed, the optical seed sensor 60 may include a transmitter and a receiver positioned on opposite sides of the seed tube 42. A light beam extending between the transmitter and the receiver serves to detect the flow of seeds through the tube 42. Specifically, as a seed passes through the tube 42 in the direction 54, the seed will interrupt the beam, thereby activating the optical seed sensor 60.

In certain embodiments, the transmitter may be contained within the second housing 64 and the receiver may be disposed within the first housing 62. However, it should be appreciated that in alternative embodiments the positions of the transmitter and the receiver may be reversed (e.g., transmitter positioned within the first housing 62, and the receiver positioned within the second housing 64). As illustrated, the first housing 62 is larger than the second housing 64. Consequently, the first housing 62 may contain circuitry and/or other components configured to send data from the sensor 60 to the ECU. For example, the first housing 62 may include a microprocessor configured to process data from the optical seed sensor 60 and/or circuitry defining a networked sensor interface configured to relay data from the sensor 60 to the ECU via a bus. In certain embodiments, the first housing 62 may contain the bounce sensor, which may share common circuitry (e.g., microprocessor, networked sensor interface, etc.) with the optical seed sensor 60.

Figure 5:
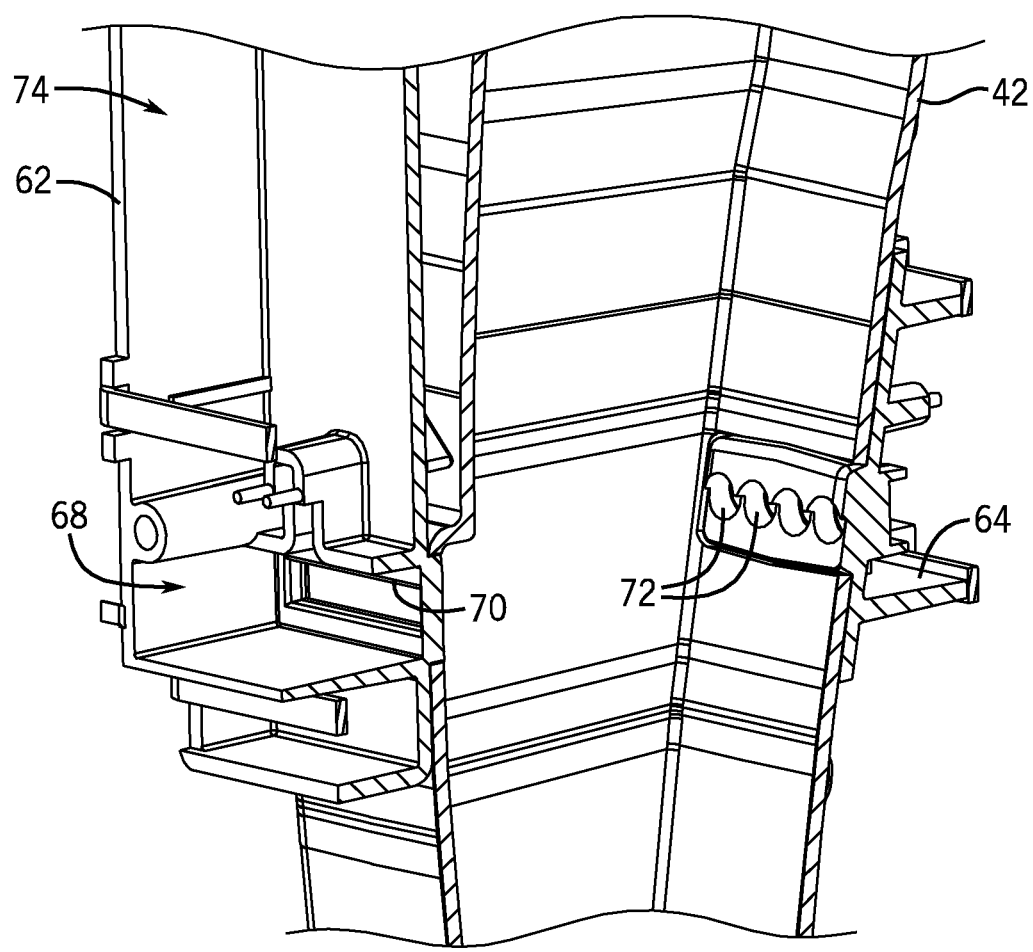
FIG. 5 is a cutaway perspective view of the seed tube, taken along line 5-5 of FIG. 4, showing a portion of the sensor housing interior.

FIG. 5 is a cutaway perspective view of the seed tube 42, taken along line 5-5 of FIG. 4, showing a portion of the sensor housing interior. As illustrated, the first housing 62 includes a cavity 68 configured to contain a portion of the optical seed sensor 60. For example, in certain configurations, the cavity 68 may house the receiver, while in alternative configurations, the cavity 68 may house the transmitter. A port 70 within the seed tube 42 adjacent to the cavity 68 facilitates light passage between the seed tube 42 and the sensor 60. For example, in embodiments in which the cavity 68 contains the receiver, light from the transmitter may pass through the port 70 and into the receiver. On the opposite side of the seed tube 42, a series of ports 72 facilitates light passage between the seed tube 42 and the second housing 64. In configurations in which the receiver is housed within the cavity 68, the transmitter may be contained within the second housing 64. In such configurations, individual light sources (e.g., light emitting diodes (LEDs), light bulbs, etc.) may be positioned to emit light through a respective port 72. In this manner, a substantially continuous beam of light may be transmitted to the receiver through the port 70, thereby facilitating detection of seeds passing through the tube 42.

As illustrated, the first housing 62 includes a second cavity 74 positioned adjacent to the first cavity 68. The second cavity 74 may contain circuitry and/or other components configured to send data from the sensor 60 to the ECU. For example, the second cavity 74 may include a microprocessor configured to process data from the optical seed sensor 60 and/or circuitry defining a networked sensor interface configured to relay data from the sensor 60 to the ECU via a bus. In certain embodiments, the second cavity 74 may contain the bounce sensor, which may share common circuitry (e.g., microprocessor, networked sensor interface, etc.) with the optical seed sensor 60.

Figure 6:
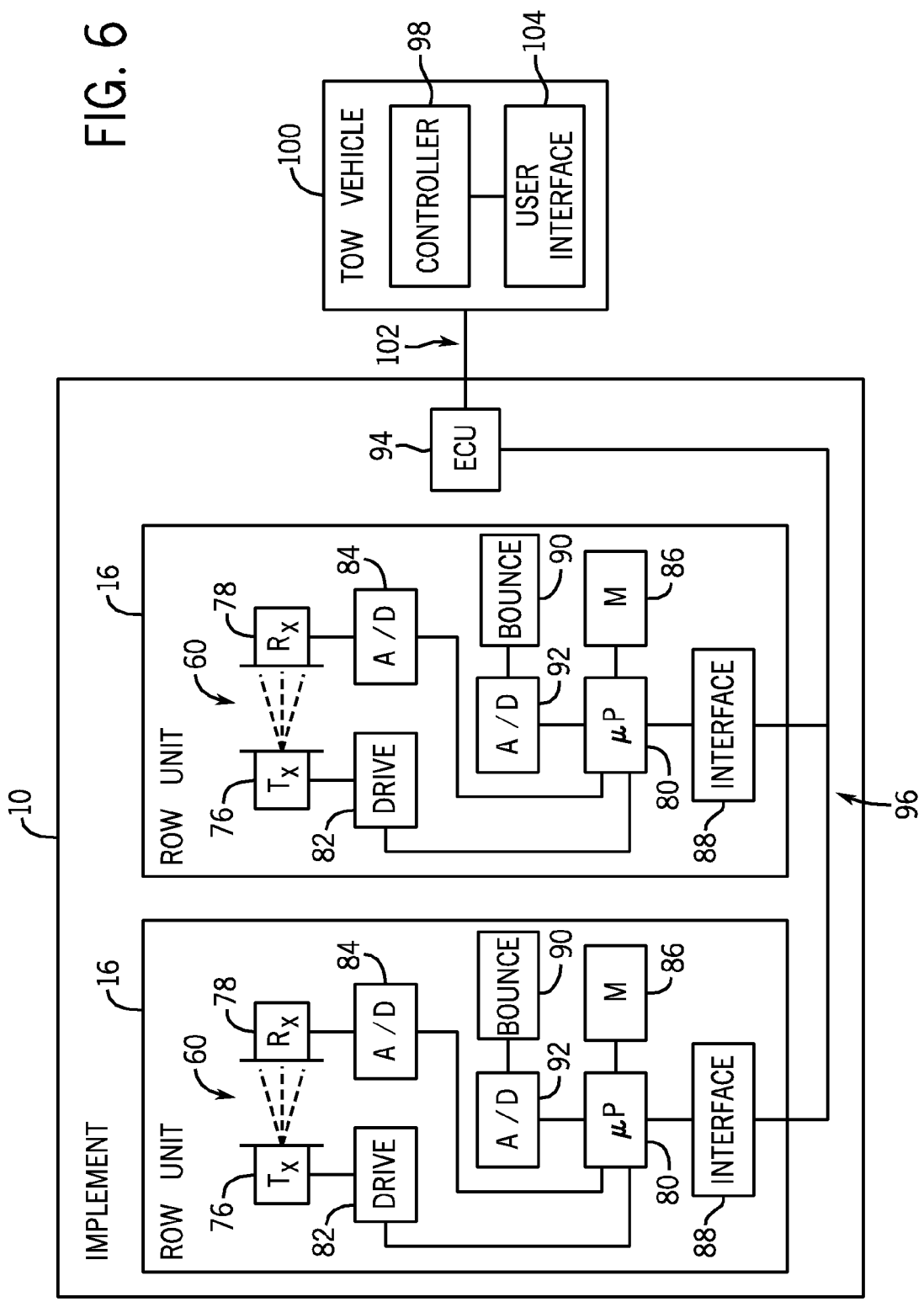
FIG. 6 is a schematic diagram of an exemplary implement having bounce sensors coupled to an electronic control unit via a bus.

FIG. 6 is a schematic diagram of an exemplary implement 10 having bounce sensors coupled to an electronic control unit via a bus. As previously discussed, the optical seed sensor 60 includes a transmitter 76 and a receiver 78 configured to detect a flow of seeds through the seed tube 42. As illustrated, a beam of light is emitted from the transmitter and detected by the receiver. In this configuration, interruption of the beam by a seed will be detected by the receiver, which will, in turn, send a signal to the ECU indicative of a detected seed. Both the transmitter 76 and receiver 78 are communicatively coupled to a microprocessor 80 configured to control the transmitter 76 and process signals from the receiver 78. Specifically, the processor 80 is communicatively coupled to a light drive 82 which provides the transmitter 76 with a suitable electrical signal. For example, in certain configurations, the transmitter 76 may include LEDs, and the drive 82 may be configured to power the LEDs based on a signal from the microprocessor 80.

In certain configurations, the receiver 78 may output an analog signal indicative of the light received from the transmitter 76. Consequently, the receiver 78 is communicatively coupled to an analog-to-digital converter 84 which converts the analog signal from the receiver 78 to a digital signal which may be processed by the microprocessor 80. In certain configurations, the processor 80 may be configured to detect the presence of a seed passing through the light beam based on the digital signal received from the analog-to-digital converter 84. For example, a memory 86 may contain patterns indicative of seed flow within the tube 42. If the processor 80 detects such a pattern, the processor may output a signal indicative of seed presence within the tube 42. A networked sensor interface 88 may then receive the signal from the processor 80, and broadcast the signal across a bus. While an optical seed sensor is described above, it should be appreciated that alternative embodiments may include other seed sensors configured to detect a flow of seeds through the seed tube 42.

As previously discussed, certain row units 16 also include a bounce sensor 90 configured to measure row unit bounce. Similar to the optical seed sensor 60, the bounce sensor 90 is coupled to an analog-to-digital converter 92 which coverts an analog signal indicative of bounce to a digital signal that may be processed by the microprocessor 80. The networked sensor interface 88 may then receive the bounce signal from the processor 80, and broadcast the signal across a bus. As previously discussed, the bounce sensor may be an accelerometer, a gyroscope, a strain gauge, or other device capable of monitoring row unit bounce. Because the bounce sensor 90 and the optical seed sensor 60 share a common microprocessor 80, memory 86 and networked sensor interface 88, the cost of monitoring bounce of the row unit 16 may be significantly lower than configurations which employ dedicated components for monitoring bounce only.

As illustrated, the networked sensor interface 88 is communicatively coupled to the ECU 94 by a bus 96. In the present configuration, the bus 96 interfaces with each row unit 16 and coveys signals from the optical seed sensor 60 and the bounce sensor 90 to the ECU 94 on the implement 10. In certain embodiments, the bus 96 may be an ISOBUS, a CAN bus, or other suitable proprietary or standard bus configuration. The ECU 94, in turn, may convey signals from the implement 10 to a controller 98 of the tow vehicle 100 by a second bus 102. For example, the ECU 94 may be configured to determine the bounce magnitude and/or direction of each row unit 16 from the signal output from the bounce sensors 90, and relay this information to the controller 98. The second bus 102 may be the same configuration as the first bus 96 (e.g., ISOBUS, CAN bus, etc.), or a different configuration. In the present embodiment, the controller 98 is communicatively coupled to a user interface 104 which may display data from the optical seed sensors 60 and the bounce sensors 90 to an operator.

The operator may monitor both the seed flow rate data and the bounce data via the user interface 104 to determine a proper speed to operate the work vehicle and/or a proper row unit down force. Because the present embodiment employs the bounce sensor 90, the operator may correlate an uneven seed flow rate, as determined by the optical seed sensor 60, with excessive bounce. For example, if the operator determines that the flow of seeds is uneven, but the level of bounce is within an acceptable threshold, the operator may maintain vehicle speed because reducing speed may have no significant effect on the seed flow. However, after seeding or planting is complete, the operator may perform maintenance on the metering system to correct the seed flow inconsistencies. Conversely, if the operator determines that the flow of seeds is uneven and the level of bounce is outside of the acceptable threshold, the operator may reduce vehicle speed and/or decrease row unit down force to reduce row unit bounce, thereby restoring the even flow of seeds from the metering system. Because the present bounce sensor facilitates increased operator awareness as to the cause of uneven seed distribution, the present embodiment may increase the efficiency of seeding and planting operations.

While two row units 16 are illustrated in the present embodiment, it should be appreciated that more or fewer row units 16 may be employed in alternative embodiments. For example, in certain configurations, 1, 2, 3, 4, 5, 10, 15, 20, 25, or more row units 16 may be coupled to the implement 10. In addition, while each row unit 16 of the present embodiment includes a bounce sensor 90, it should be appreciated that alternative embodiments may include row units 16 without the bounce sensor 90. For example, in certain configurations, one bounce sensor 90 may be coupled to every other row unit, every third row unit, etc. In addition, while a bus configuration is illustrated, it should be appreciated that in alternative embodiments, each row unit may be directly coupled to the ECU 94 and/or the controller 98. Furthermore, while the bounce sensor 90 shares common circuitry with the optical seed sensor 60 in the present embodiment, in alternative embodiments, the bounce sensor 90 may share common circuitry with other electronic networks within the implement 10. In yet further embodiments, the bounce sensor 90 may be coupled to other areas of the implement 10, such as the tool bar 14, to measure bounce of the implement 10. In such embodiments, the bounce sensor 90 may still utilize a common network (e.g., networked sensor interface 88, first bus 96, and/or second bus 102) with the seed sensors 60.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An agricultural implement system, comprising:
   a plurality of row units each configured to deposit seeds within soil, wherein each row unit comprises a seed tube configured to direct seeds into the soil, a housing mounted to the seed tube, and a seed sensor disposed within the housing, and wherein the seed sensor is configured to monitor a flow of seeds through the seed tube; and a bounce sensor rigidly coupled to at least one row unit, wherein the bounce sensor is disposed within the housing of the at least one row unit and configured to output a signal indicative of a bounce magnitude, a bounce direction, or a combination thereof, of the at least one row unit.

2. The agricultural implement system of claim 1, comprising an electronic control unit configured to receive data from a networked sensor interface, wherein the bounce sensor is configured to output the signal indicative of bounce to the networked sensor interface.

3. The agricultural implement system of claim 2, wherein the electronic control unit is configured to output a signal to a tow vehicle controller indicative of bounce.

4. The agricultural implement system of claim 1, wherein the bounce sensor comprises an accelerometer.

5. The agricultural implement system of claim 1, comprising a plurality of bounce sensors, wherein each bounce sensor is rigidly coupled to each row unit.

6. The agricultural implement system of claim 5, comprising an electronic control unit configured to receive data from each bounce sensor and compute an average bounce magnitude, an average bounce direction, or a combination thereof.

7. The agricultural implement system of claim 1, wherein the at least one row unit comprises circuitry disposed within the housing of the at least one row unit, the circuitry being communicatively coupled to the seed sensor and to the bounce sensor, and configured to process signals received from the seed sensor and from the bounce sensor.

8. An agricultural implement system, comprising:
a row unit having a seed sensor configured to monitor a flow of seeds and to output a first signal through a networked sensor interface indicative of the flow of seeds;
a bounce sensor configured to output a second signal through the networked sensor interface indicative of a bounce magnitude, a bounce direction, or a combination thereof, of the agricultural implement system;
an electronic control unit configured to receive the first signal and the second signal from the networked sensor interface and to determine the bounce magnitude, the bounce direction, or a combination thereof, based on the second signal; and
a housing mounted to a seed tube of the row unit, wherein the housing at least partially encloses the seed sensor and the bounce sensor.

9. The agricultural implement system of claim 8, wherein the bounce sensor is rigidly coupled to the row unit.

10. The agricultural implement system of claim 8, wherein the electronic control unit is configured to output a third signal to a tow vehicle controller indicative of the bounce magnitude, the bounce direction, or a combination thereof.

11. The agricultural implement system of claim 8, comprising a plurality of row units each having a seed sensor, wherein each seed sensor is configured to output the first signal through the networked sensor interface.

12. The agricultural implement system of claim 11, comprising a plurality of bounce sensors, wherein each bounce sensor is rigidly coupled to each row unit, and each bounce sensor is configured to output the second signal through the networked sensor interface.

13. The agricultural implement system of claim 11, comprising a bus configured to relay the first signal and the second signal from the networked sensor interface to the electronic control unit.

14. The agricultural implement system of claim 8, wherein the bounce sensor comprises an accelerometer.

15. The agricultural implement system of claim 8, wherein the housing at least partially encloses the networked sensor interface.

16. An agricultural implement system, comprising:
a plurality of row units each having a seed sensor configured to monitor a flow of seeds and to output a first signal through a networked sensor interface indicative of the flow of seeds;
a bounce sensor rigidly coupled to at least one row unit, wherein the bounce sensor is configured to output a second signal through the networked sensor interface indicative of a bounce magnitude, a bounce direction, or a combination thereof, of the at least one row unit;
an electronic control unit configured to receive the first signal and the second signal from the networked sensor interface and to determine the bounce magnitude, the bounce direction, or a combination thereof, based on the second signal; and
a plurality of housings each mounted to a respective seed tube of each row unit, wherein each housing at least partially encloses the seed sensor, and the housing of the at least one row unit at least partially encloses the bounce sensor.

17. The agricultural implement system of claim 16, comprising a plurality of bounce sensors each rigidly coupled to each row unit.

18. The agricultural implement system of claim 16, comprising a bus configured to relay the first signal and the second signal from the networked sensor interface to the electronic control unit.

19. The agricultural implement system of claim 16, wherein the electronic control unit is configured to output a third signal to a tow vehicle controller indicative of the bounce magnitude, the bounce direction, or a combination thereof.

20. The agricultural implement system of claim 16, wherein the housing of the at least one row unit at least partially encloses the networked sensor interface.

* * * * *